Figure 1:
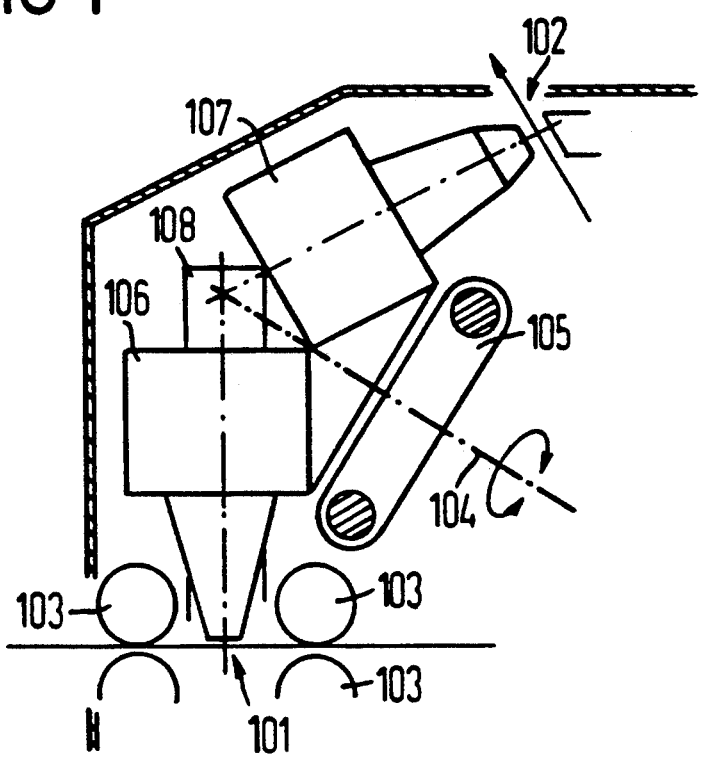

United States Patent [19]

Schimmelpfennig et al.

[11] Patent Number: 5,330,274
[45] Date of Patent: Jul. 19, 1994

[54] PRINTING DEVICE HAVING AT LEAST TWO PRINTING STATIONS SEPARATED SPATIALLY FROM ONE ANOTHER

[75] Inventors: Rolf Schimmelpfennig, Munich; Heinz Strohdiek, Paderborn, both of Fed. Rep. of Germany

[73] Assignee: Siemens Nixdorf Informationssysteme Aktiengesellschaft, Fed. Rep. of Germany

[21] Appl. No.: 752,484
[22] PCT Filed: Mar. 7, 1990
[86] PCT No.: PCT/DE90/00166
§ 371 Date: Mar. 13, 1992
§ 102(e) Date: Mar. 13, 1992
[87] PCT Pub. No.: WO90/10917
PCT Pub. Date: Sep. 20, 1990

[30] Foreign Application Priority Data

Mar. 8, 1989 [DE] Fed. Rep. of Germany ... 8902848[U]
Jul. 31, 1989 [DE] Fed. Rep. of Germany ... 8909248[U]

[51] Int. Cl.$^5$ ............................................. B41J 3/54
[52] U.S. Cl. ...................................... 400/82; 400/149; 400/150
[58] Field of Search ............... 400/82, 636, 149, 150, 400/151

[56] References Cited

U.S. PATENT DOCUMENTS

| 4,527,918 | 7/1985 | Yamamoto et al. | 400/82 |
| 5,051,008 | 9/1991 | Honda et al. | 400/59 |
| 5,067,832 | 11/1991 | Baur et al. | 400/593 |
| 5,120,145 | 6/1992 | Kawahara | 400/636 |

FOREIGN PATENT DOCUMENTS

| 2506632 | 9/1976 | Fed. Rep. of Germany . | |
| 0012666 | 1/1982 | Japan | 400/82 |
| 0095483 | 6/1982 | Japan | 400/82 |
| 0056575 | 4/1985 | Japan | 400/82 |
| 0061275 | 4/1985 | Japan | 400/82 |
| 0152468 | 7/1986 | Japan | 400/82 |
| 0081060 | 4/1988 | Japan | 400/82 |

OTHER PUBLICATIONS

Japanese Patent Abstract, (11) 60-231277(A), Bar Code Printer and Reader, vol. 10 No. 101 (P-447) [2158] Apr. 17, 1986.

Primary Examiner—Edgar S. Burr
Assistant Examiner—John S. Hilten
Attorney, Agent, or Firm—Hill, Steadman & Simpson

[57] ABSTRACT

A printing head (106) as a first functional unit and at least one further functional unit (107) of the same kind or of a different kind are attached to a common carrier (105) and mounted by means of a carriage for displacement in each case in parallel in the direction of the print lines and are arranged so as to swivel between the individual working areas of the printing device by means of a common swivel drive. The arrangement of the individual functional units (106, 107) on the carrier (105) and the alignment of the swivel axis (104) are selected such that the functional units can be swiveled in each case in the direction of the print lines and perpendicularly to the feed direction out of and into the respective printing station (101, 102).

12 Claims, 7 Drawing Sheets

PRINTING DEVICE HAVING AT LEAST TWO PRINTING STATIONS SEPARATED SPATIALLY FROM ONE ANOTHER

BACKGROUND OF THE INVENTION

1. Field of the Invention

The invention relates to a printing device having at least two working areas which are separated spatially from one another and each have separate feed devices for the original assigned to the respective working area, using at least one printing head and at least one further functional unit of the same kind or different.

2. Description of the Related Art

Printing devices of this kind are preferably considered for use in counter workstations in which, for example, forms, savings books, checks, identification papers, labels or the like are printed and read and, in addition, receipts, cash slips etc. are issued for the customers and/or printed journals are kept. In view of the usual lack of space at the counter workstation, devices of this kind should only have very small external dimensions. On the other hand, simple handling and a high degree of accessibility are required during maintenance, for example when changing the ink ribbon, for the operation at the counter to proceed as rapidly and free of faults as possible.

In view of these requirements, concepts in which a separate printing head with separate drive and, if appropriate, also a reading head are used for each printing station do not come into practical consideration because of the increased outlay in terms of costs and the space requirement due to the plurality of units.

It is therefore already known (cf. DE A 3,039,124), to arrange the printing head and reading head next to one another on a common intermediate carrier and to provide a common drive for both units. This arrangement requires both a complicated ink ribbon guidance for the printing head, so that the reading window of the reading head arranged directly next to it is not covered and also an increased space requirement in terms of width since, in order to read and write the complete form width, the reading head must be moved beyond the form on the one side and on the other side the printing head must be moved beyond the form if a loss in form width is not to be accepted and the two margins are not to be dispensed with when reading and writing. Even here, the outlay is also still considerable because, as before, a separate printing head including drive and actuation must be provided for a separate printing station.

Therefore, another known device already provides a swivelable carrier element to which only a single printing head and a reading head arranged perpendicularly to the printing head are attached. The swivel axis of the carrier element drive extends in such a way that the printing head can be swiveled forwards and backwards perpendicularly to the direction of the lines between two printing stations. This swivelable arrangement also requires a large amount of space because in one swivel position the reading head protrudes to the front and only assumes a park position there, whilst in the other swivel position the printing head extends backwards into the device to a corresponding degree. A further amount of space in terms of width may also be required under certain circumstances if the printing head has to be positioned laterally outside the roller area of the feed device to swivel.

SUMMARY OF THE INVENTION

The present invention is based on the object of improving a printing device of the type mentioned at the beginning in such a way that the printing and reading units attached on a swivel drive can be used on the individual printing stations in as versatile a manner as possible, that the amount of space required for this arrangement can be kept as small as possible and that, in addition, the device can be easily handled and serviced.

The solution of this object results according to the invention a printing device having at least two working areas which are separated spatially from one another and each having separate feed devices for a printed original assigned to the respective working area, the printing device using at least one printing head as a first functional unit and at least one further functional unit of the same kind or of a different kind, the functional units being attached to a common carrier and mounted for displacement in each case in a direction parallel to the direction of the print lines by means of a carriage. The functional units are arranged so as to swivel between the individual working areas by means of a common swivel drive, a swivel axis of the swivel drive running perpendicularly to the direction of the print lines. The arrangement of the individual functional units on the carrier is such that the functional units can be swiveled in each case in the direction of the lines and perpendicularly to the paper feed direction out of and into the respective working areas. A device of this kind requires a very small amount of space overall, to be precise, both in terms of width since the swivel movement occurs in the center of the printing field in the direction of the printing line, i.e. perpendicularly to the feeding direction of the original and in terms of depth because, due to the swivel process, the individual functional units merely interchange their working place and therefore none of the functional units remains in the interim in a park position which takes up space.

Advantageous developments of the invention include the functional units being arranged on the common carrier so they are in such a way that, with respect to the plane running perpendicularly to the swivel axis, they are arranged at $\alpha$ angles of the same size relative to a plane perpendicular to the swivel axis, the angles $\alpha$ being in a range of $45° \leq \alpha \leq 90°$. Further, apart from the printing head, the functional units are arranged in such a way that at the same time at least two functional units can be swiveled mutually into respectively assigned working areas. The further functional units may be for example, a second further printing head, a sensor head, an optical reading head, a magnetic writing-reading head or a cutting blade.

An example of a swivel drive includes a swivel plate with a hollow-cylindrical projection which is swivelably mounted in a bushing provided on the carriage, and a swivel motor attached to the carriage and coupled mechanically via a pinion to a gearwheel on the swivel plate. The printing head and/or the further functional units are mounted axially displaceably, with respect to the spacing to the respective working area, by means of controllable lifting devices. These lifting devices comprise an axial lifting motor which, by means of cam plates, brings about a height adjustment of the printing head and/or of the further functional units.

The working area of a preferred embodiment is constructed as a flatbed document printing device in which the flatbed document track has a pressure bar serving as a printing block and spring-loaded roller pairs which are arranged on both sides of the pressure bar. In each case, at least the lower rollers of a roller pair are coupled to a controllable document conveyor motor and the respective upper rollers are mounted so as to swivel out upwardly.

Thus it is provided, inter alia, that the individual functional units, i.e. the printing head and possibly a reading head, a writing-reading head or a cutting blade constructed as a roller blade are arranged on a swivel plate in such a way that at least two of these functional units are directed to in each case one printing block of a working area.

The two functional units are arranged with their axes on the swivel plate at, for example, an obtuse angle with respect to one another in the direction of the printing block, so that even when swiveling they do not require any space in excess of the usual contours of a printing mechanism. In particular applications, a right-angled or extended position of the functional units with respect to one another can be provided; this depends on the desired printing planes. If a cutting device is provided, this is advantageously mounted in further working positions of the swivel plate. The roller blade is then applied in each case to one edge of a pressure bar as a corresponding cutting edge.

The functional units are advantageously mounted axially displaceably on the swivel plate in axial carriages and are adjustable in the axial direction so that they can be raised, in each case under the control of the printing block and document, in order to allow documents to pass which are to be inserted. Both axial drives are advantageously to be actuated by a controllable motor. In its print setting, the printing head is supported in a non-positively connecting manner on the document to be printed by means of a distancing roller so that tolerances in the head bearing with respect to the printing block and the document thickness do not have any influence on the effective pin stroke which is significant for the print quality. If a head lift control is provided it is advantageously possible to move it into the raised position in each case before swiveling the heads since then the required swivel area is smaller, which leads to a structural miniaturization of the surrounding housing.

The drives for swiveling for the ink ribbon and/or the head lift can be mounted on the chassis side. They are connected by means of drive means, such as cables or belts, guided over the width of the carriage to the swivel plate to be driven, to the ink ribbon cartridge drive or the head lift device.

As a further alternative for the swivel drive, the ink ribbon drive and/or the head lift drive, controlled clutches can also be arranged between parts connected rigidly to the chassis, for example the pressure bar or the carriage or a cable or belt, and the parts connected rigidly to the carriage which in each case when coupled bring about a transmission of the carriage movement to the associated drive.

In a preferred embodiment, the axial drive motor and an ink ribbon drive motor are advantageously arranged on the swivel plate and also the swivel motor is advantageously arranged on the carriage so that no mechanical gearing elements are guided on the carriages and a compact head assembly is formed with the carriage. This head assembly can be installed in printing devices of varying widths which can be equipped with different document conveying devices.

A preferred arrangement of the printing areas contains a flatbed guideway mounted below which has a document supply support mounted upstream of it outside the housing so that account cards, savings books, labels etc. are to be inserted there and can be read and printed on. A further upper printing block serves for printing on two tracks, these being expediently held at different widths, the one track serving to convey a journal which is wound up again inside the printer housing and the other, narrower track serving for conveying receipts which are led out from a slot in the housing.

In order to offer a good degree of accessibility of the printing tracks for fitting new journal paper or receipt paper, the upper printing block which is constructed as a pressure bar is swivelably mounted on its sides. Furthermore, an intervention facility into the flatbed conveyor track is provided by mounting the upper guide plates and the pressure rollers so they are capable of swiveling up together when the head assembly is moved to the side so that parts of documents which may be causing faults can be easily removed.

A particularly good degree of accessibility to the flatbed conveyor track is obtained by means of a swivelable bearing of the carriage track in side pieces which can be fixed on the chassis by locking. Any tolerances of the carriage track with respect to the print blocks are compensated by means of the axial displaceability of the heads.

Figure 2:
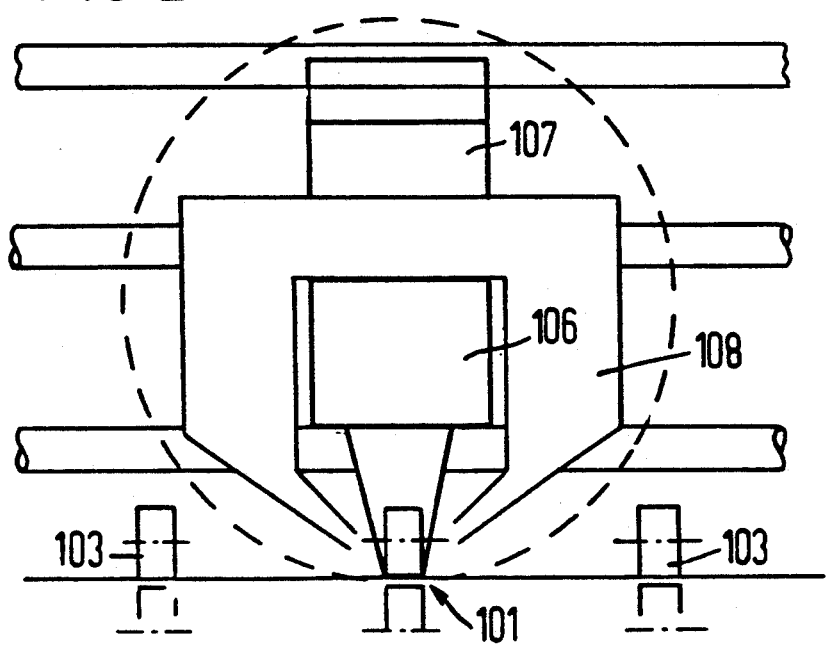
Figure 3:
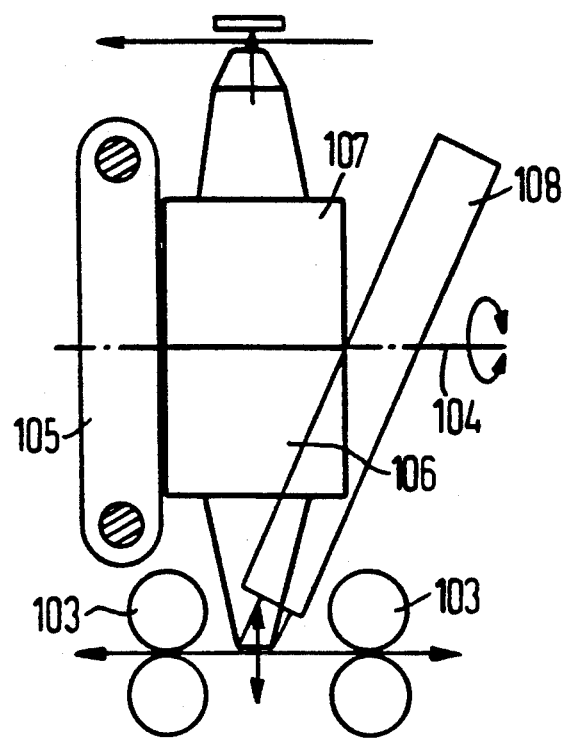
Figure 4:
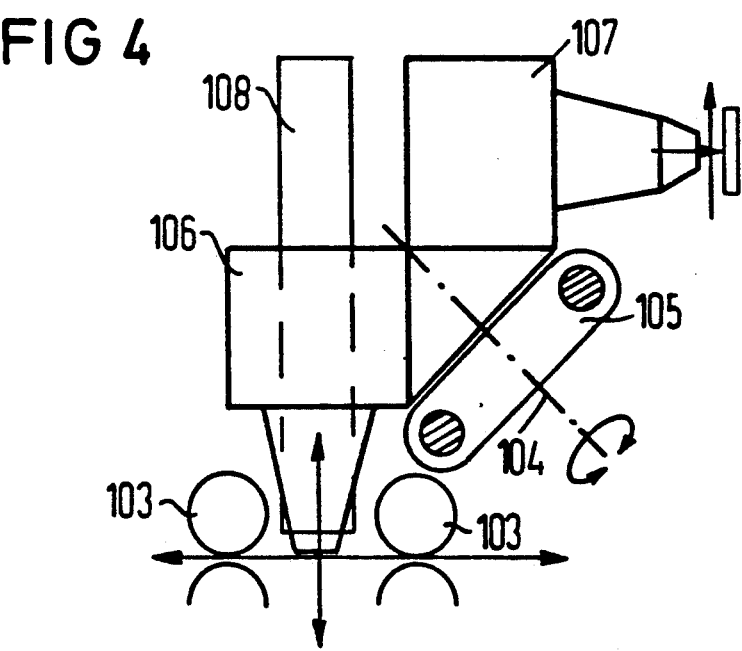
Figure 5:
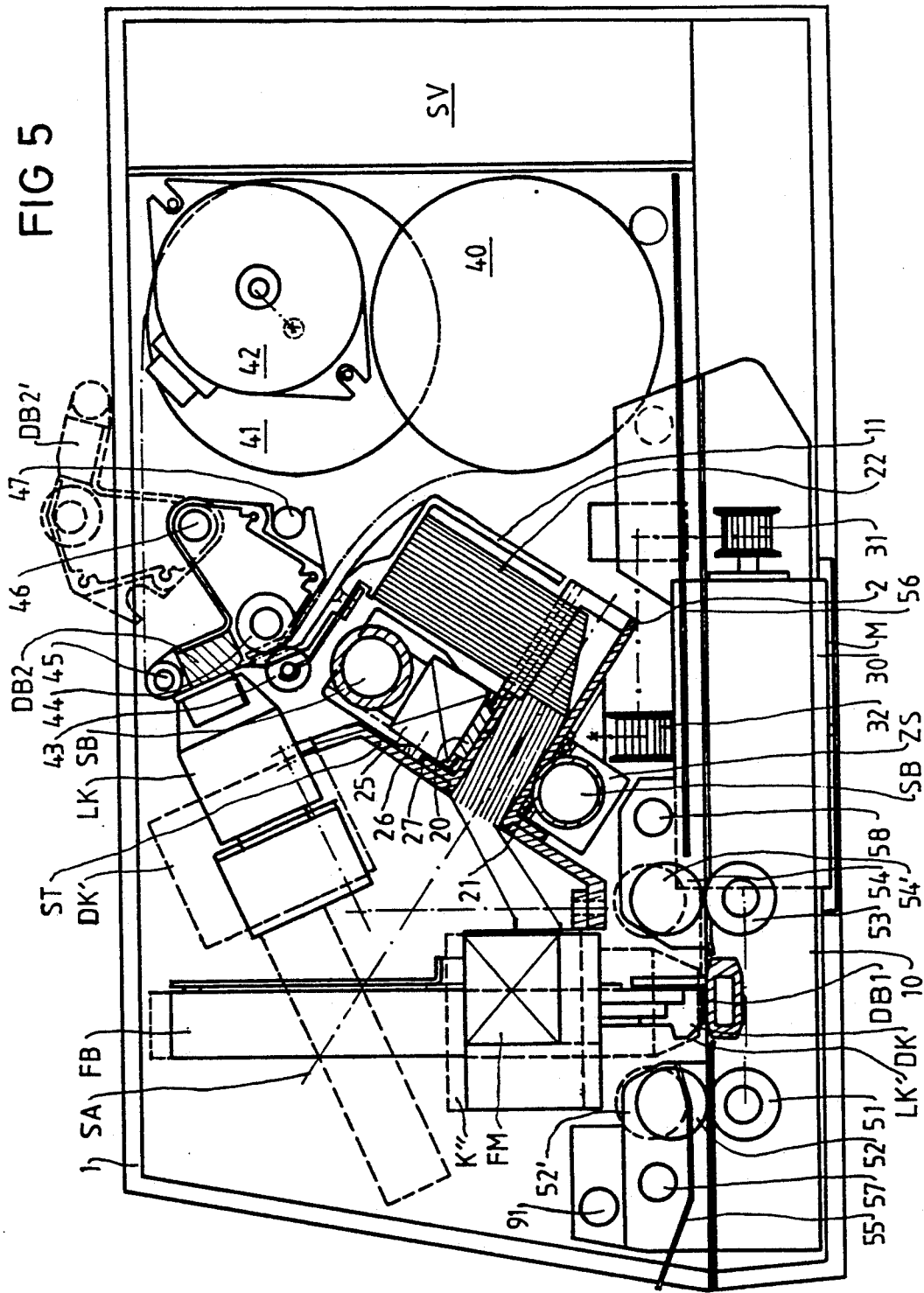
Figure 6:
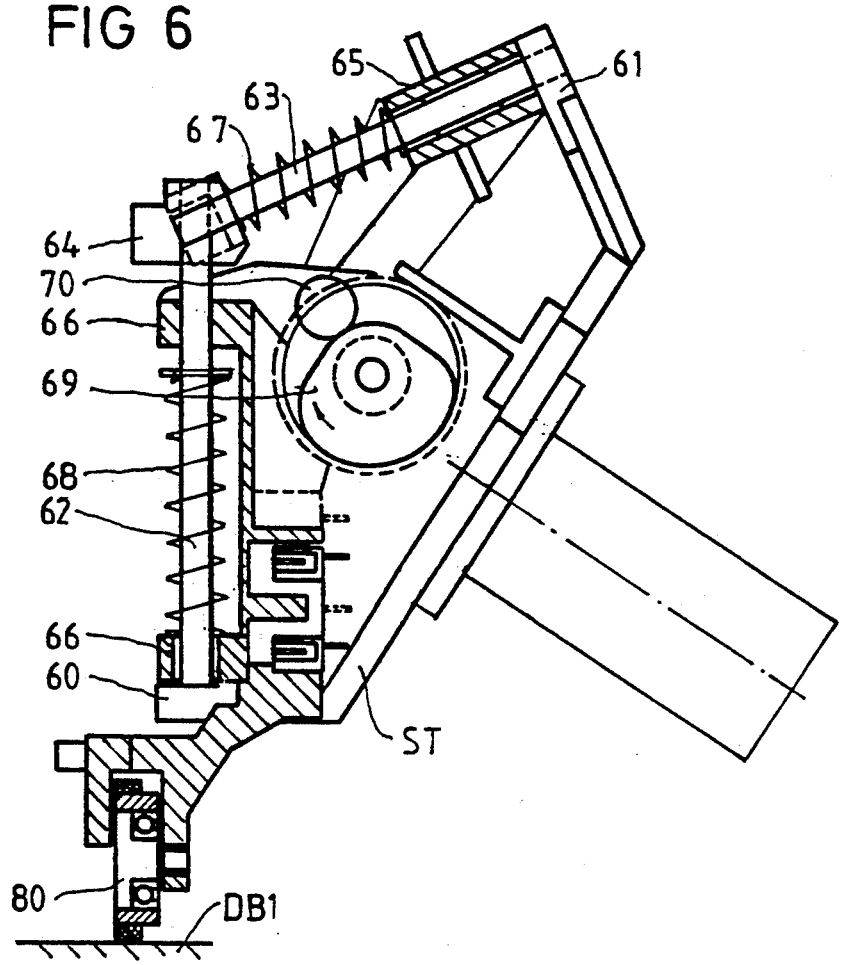
Figure 7:
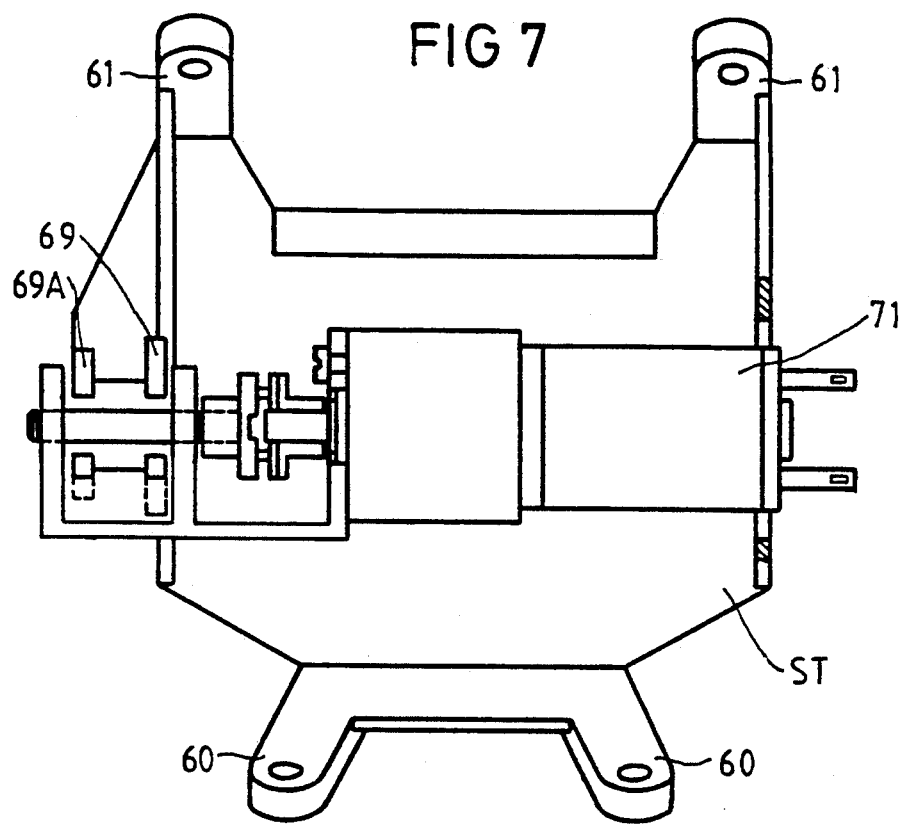
Figure 8:
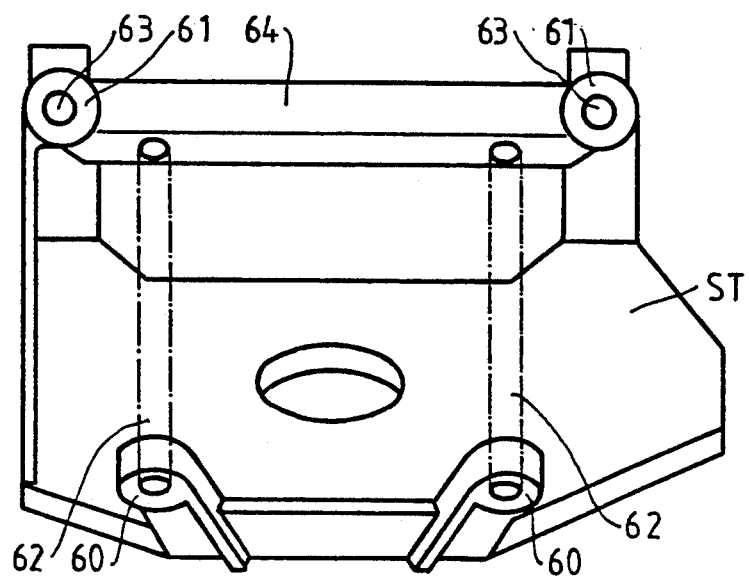
Figure 9:
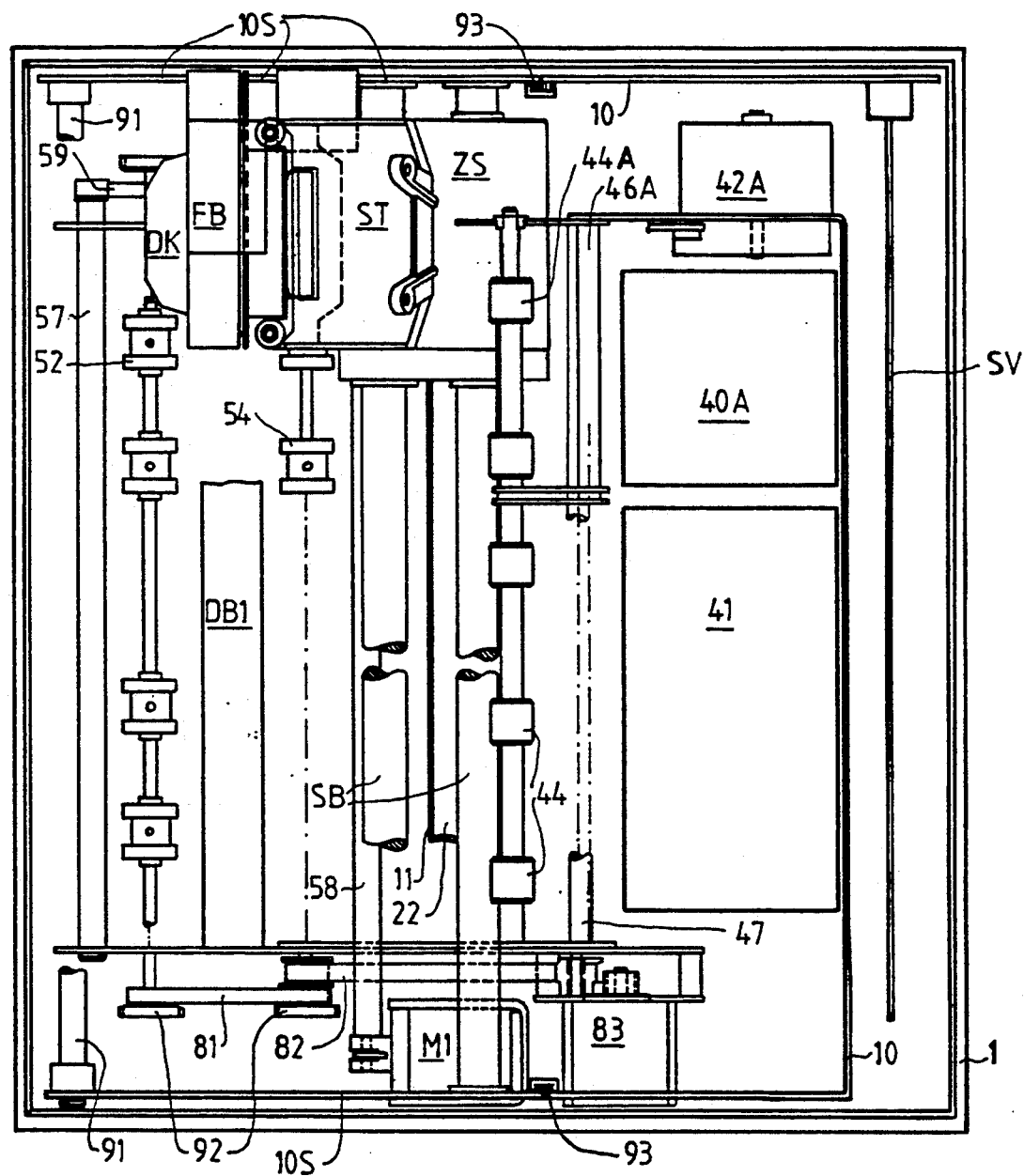
Figure 10:
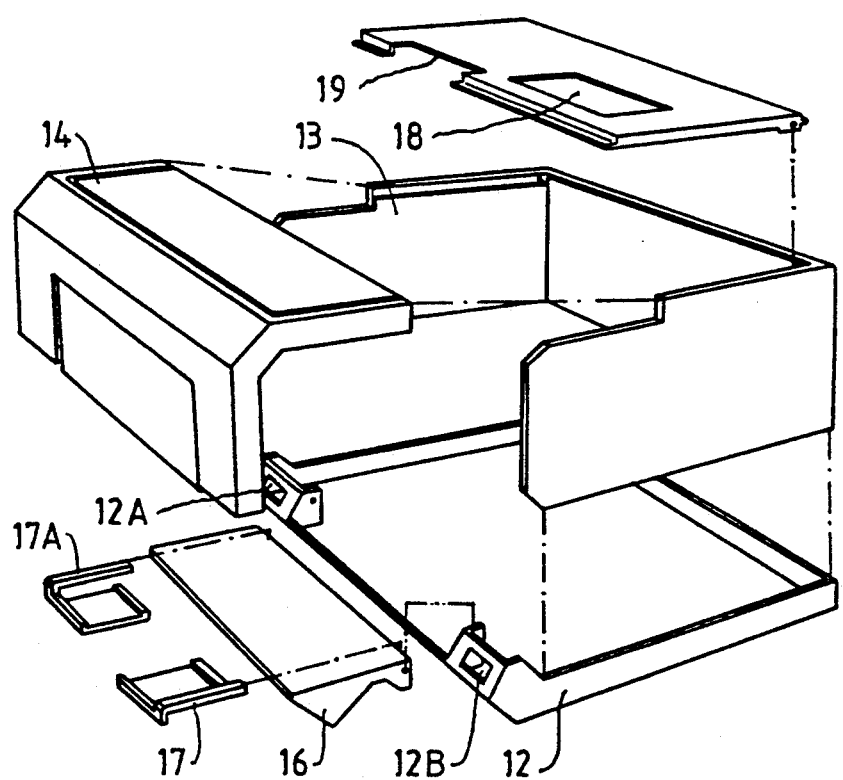

Exemplary embodiments of the invention are explained in greater detail below with reference to the drawing, in which:

FIGS. 1, 2 show the principle of a printing device according to the invention in side and front view, FIGS. 3, 4 show two further exemplary embodiments, in each case in side view, FIG. 5 shows a side view of a printing device according to the invention with the side wall of the housing removed and in diagrammatic form, FIG. 6 shows a swivel drive with a swivel plate as well as an axial carriage in side view, FIG. 7 shows the swivel plate with the axial drive viewed in the direction of the swivel axis, FIG. 8 shows the swivel plate viewed in the direction of the reading head axis, FIG. 9 shows the outline of the printing device in diagrammatic form and partially disassembled with the housing lid removed, FIG. 10 shows an exploded view of the housing of the printing device.

FIGS. 1 and 2 show a printing device with two printing stations 101, 102 of which one is constructed as a flatbed printer with bidirectional feed device (see the feed rollers 103) and the other as a journal printer. In the space between the two printing stations 101, 102, a carrier 105 which can be swiveled about an oblique swivel axis 104 and to which a printing head 106 and an OCR reading head 107 are fastened is provided. The printing head 106, arranged perpendicularly above the flatbed printing station 101 and the OCR reading head 107 are at an obtuse angle to one another, the swivel axis 104 running in the angle bisecting line situated between them. With respect to the plane running perpendicularly to the swivel axis, the functional units printing head 106 and reading head 107 are arranged at an acute angle $\geq 45°$ of equal size. Due to this arrangement, the functional units can be swiveled backwards and forwards if required between the individual printing stations in each case in the direction of the print lines, i.e. transversely to the respective feed direction. The ink ribbon cartridge 108 assigned to the printing head 106 does not have to be removed during the swivel process but rather swivels together with the printing head 106 into the respective other printing position.

As required, the illustrated device can be equipped differently with respect to the functional units. Thus, for example, printing heads may be used exclusively, it being possible if required to use printing heads of different technology (needle, ink, thermal printing etc.). A bar code reader can additionally be attached to the reading head. There is also, if required, the possibility of additionally providing a reading head between two printing heads located opposite one another.

FIG. 3 shows an embodiment in which the functional units are arranged in a swivel plane running perpendicularly to the swivel axis, the swivel axis running parallel to the two feed devices of the respective printing stations.

In the embodiment according to FIG. 4 in which, as in FIG. 3, the reference symbols from FIGS. 1 and 2 are used, the two functional units are arranged at an angle of 45° to the plane running perpendicularly to the axis of rotation so that the functional units are at a right angle to one another. In this arrangement, the original for the printing station 102 is led out perpendicularly upwards.

FIG. 5 shows a printing device in simplified form in a lateral section with the side wall removed. A printing head DK and a reading head LK as further functional units are arranged on a swivel plate ST so as to swivel about the swivel axis SA. The swivel plate ST plugs with a hollow-cylindrical projection 2 into a bushing 20 with ball bearings 21 which is mounted on a carriage ZS. This carriage ZS is displaceably mounted in the direction of the lines on the rods serving as carriage track SB. A cable 22 is fed through the bushing 20 and hollow-cylindrical projection 2 so as to be flexible and rotatable through 180°, via which cable the magnets of the needle printing head DK, the reading head LK and an ink ribbon drive motor FM of an ink ribbon FB and a further motor are electrically supplied. The cable 22 is led out of the carriage ZS as a ribbon cable in a cable conduit 11 fixed to the housing in a known way and connected to an electronic control device SV. In the swiveled position, the printing head DK' and the reading head LK' are illustrated by dashed lines so that it can be recognized that, inclusive of the ink ribbon, virtually no additional space is required for a swivel area of the heads.

Arranged in the carriage ZS is a swivel motor 25 which intermeshes with a pinion 26 in a gearwheel 27 of the hollow-cylindrical projection 2. The carriage drive occurs with a carriage motor 30, mounted on the chassis side, by means of a belt drive 31 and a toothed belt drive 32 to which the carriage ZS is attached.

In the housing 1, a chassis 10 is used which receives the carriage track SB, the carriage drive 30 -32, two pressure bars DB1, DB2 serving as printing blocks, as well as journal paper rolls 40, 41 and their conveying attachment and winding drive 42 and the receipt guides and supports them with the side walls. The control device SV is arranged in the rear region. The journal is fed from the supply roller 40 by means of a spring-loaded pair of conveyor rollers 43, 44 and by means of a deflection roller 45 to the journal winding roller 41. The deflection roller and the conveying roller 44, 45 as well as the pressure bar DB2 can be swiveled as assemblies on side pieces into the position of the pressure bar DB2' shown by dashed lines about a swivel axis 46 so that the journal paper can be easily inserted. When swiveled down, this assembly is supported on and locked to a support 47.

In the front, lower housing region, a flat bed document guide 51–56 is arranged which consists of a document baffle 55, constructed as an insertion funnel, a further document baffle 56 forming a document shaft and spring-loaded pairs of guide rollers 51, 52, 53, 54 which are positioned in each case in front of and behind the pressure bar DB1. At the same time, the printing head DK and the reading head LK can be displaced axially into a raised head position K".

FIG. 6 shows details of the swivel plate ST with heads removed. Two angled-off retaining arm pairs 60, 61 in which guide bolts 62, 63 are held in pairs and received at the other end in a crossbar 64 are located on the said swivel plate ST. An axial carriage 65, 66, aligned in each case in the direction of the head axes, for the reading head and printing head (not illustrated) is guided axially displaceably on the guide bolts 62, 63. The axial carriages 65, 66 are loaded by springs 67, 68 in each case in one direction and supported in the opposite direction thereto on in each case one cam plate 69 by means of in each case one dog 70.

The axial carriage 66 bearing the printing head is supported with a spacing roller 80 on the pressure bar DB1 or the document lying thereon when it is released by the cam plate 69.

FIG. 7 shows a view of the swivel plate ST with heads removed and axial carriages removed. Mounted on the said swivel plate is an axial travel motor 71 which bears at the end two cam plates 69, 69A on which in each case one of the dogs of the two axial carriages is supported. The axial travel motor 71 is arranged transversely to the retaining arm pairs 60, 61 in a space-saving way.

FIG. 8 shows a view of the swivel plate ST obliquely from below without the axial travel motor and with guide bolts 62, 63 which are inserted into the retaining arm pairs 60, 61 in pairs and are held at the other end in the crossbar 64.

FIG. 9 shows a top view of the printing device with the top opened up. The control device SV is mounted in the rear area of the housing 1. In front of it, the chassis 10 is located which is composed of a plurality of parallel side walls by means of transverse rods. The upper pressure bar and the reading head are constructed so that the carriage track SB, the carriage ZS and the swivel plate ST with the printing head DK and the ink ribbon FB can be seen. Parallel to the lower pressure bar DB1, the pressure rollers 52, 54 can be seen which are drawn in a partially cutaway form. In the lateral chassis area, the drives 81, 82 of the drive rollers, lying below, of the flatbed guide and its document drive motor 83 can be seen.

A first electromagnet M1 acts on the swivel axis 58 of the rear pressure rollers 54 of the flat bed conveyor and a further electromagnet, which is not visible, acts via a gearing connection 59 on the swivel axis 57 of the front pressure rollers 52. The pressure of the rollers by means of the magnets M1 is controlled in a known manner by means of light barriers which are arranged near to the roller axles in the document conveying area. In the end region of the axles of the pressure rollers 51, 52; 53, 54, gearwheel pairs 92 are arranged which intermesh with one another in the pressed-on state and drive the roller pairs synchronously in each case on both sides of the document.

For the purpose of good accessibility of the document track in the event of servicing, the upper roller axles can be swiveled up together with the guide plates through which the rollers 52, 54 project into the document track. Furthermore, for the sake of good accessibility the shafts of the carriage track SB are fastened in side pieces 10S of the chassis, which pieces are mounted so as to swivel about the front axle 91 and can be connected and locked to the chassis 10 in each case using a locking device 93. The carriage drive M, (FIG. 1), is also attached to the side pieces 10S so that the entire carriage device, including the swiveling device with the buttons, can be swiveled out.

In the center housing region, a newsprint roll 41 and a receipt or label supply roll 40A are located. The conveyor motor 42A is attached to the chassis wall next to the supply roller. The said motor drives a pair of rollers consisting of drive rollers (not shown) and the associated pressure rollers 44A. The pair of rollers can be swiveled about a swivel axis 46A, like the pressure rollers 44 of the journal transporter, and can be locked to a block 47.

FIG. 10 is an exploded drawing of the housing which consists of a floor trough 12, a U-shaped side frame 13, an angular front flap 14, a cover flap 15 and a front document supply support 16 with clamp-shaped adjustable lateral document stops 17, 17A. All the parts can be detachably locked to one another so that all the assemblies are freely accessible in the event of servicing. In the cover flap 15, there is a viewing window 18 for the printing of journals and a receipt slip removal slot 19. On the front of the floor trough 12 there are lateral openings 12A, 12B for operating switches and displays.

Although other modifications and changes may be suggested by those skilled in the art, it is the intention of the inventors to embody within the patent warranted hereon all changes and modifications as reasonably and properly come within the scope of their contribution to the art.

I claim:

1. A printing device having at least two working areas which are separated spatially from one another and each have separate feed devices for an original assigned to the respective working area, comprising: a first functional unit including at least one printing head assigned to a first of said working areas, at least one further functional unit assigned to a second of the working areas, a common carrier to which said at least one printing head and said at least one further functional unit are attached, means including a carriage for displacing said first functional unit and said second functional unit in a direction parallel to a direction of print lines, and means including a common swivel drive for defining a swivel axis and for swiveling said first functional unit and said second functional unit between said work areas about said swivel axis, said swivel axis extending perpendicularly to the direction of the print lines.

2. The printing device as claimed in claim 1, wherein said first functional unit and said at least one further functional unit lie at angles $\alpha$ of a same size with respect to a plane running perpendicularly to the swivel axis, the angle $\alpha$ being in a range of approximately $45° \leq \alpha \leq 90°$.

3. A printing device as claimed in claim 1, wherein said further functional unit comprises a cutting blade.

4. The printing device as claimed in claim 1, wherein said at least one further functional unit comprises a printing head.

5. The printing device as claimed in claim 1, wherein the swivel drive comprises a swivel plate with a hollow-cylindrical projection which is swivelably mounted in a bushing provided on the carriage, and a swivel motor attached to the carriage and coupled mechanically via a pinion to a gearwheel on the swivel plate.

6. The printing device as claimed in claim 1, further comprising: a controllable lifting means for axially displaceably mounting at least one of the printing head and the further functional units with respect to the spacing to the respective working area.

7. The printing device as claimed in claim 6, wherein the lifting means comprises an axial lifting motor which, by means of cam plates brings about a height adjustment of the printing head and/or of the further functional units.

8. The printing device as claimed in claim 1, wherein said working area is a flatbed document printing device having a flatbed document track in which a pressure bar serves as a printing block and spring-loaded roller pairs are arranged on both sides of the pressure bar.

9. The printing device as claimed in claim 8, wherein in each case at least lower rollers of said roller pairs are coupled to a controllable document conveyor motor and respective upper rollers are mounted so as to swivel out upwardly.

10. A printing device as claimed in claim 1, wherein said further functional unit comprises a sensor.

11. A printing device as claimed in claim 1, wherein said further functional unit comprises a an optical reading head.

12. A printing device as claimed in claim 1, wherein said further functional unit comprises a magnetic writing-reading head.

* * * * *